Oct. 8, 1963    J. E. BELSKI    3,106,316
ARTICLE ORIENTING MECHANISMS
Filed Oct. 18, 1960    2 Sheets-Sheet 1
Fig.1
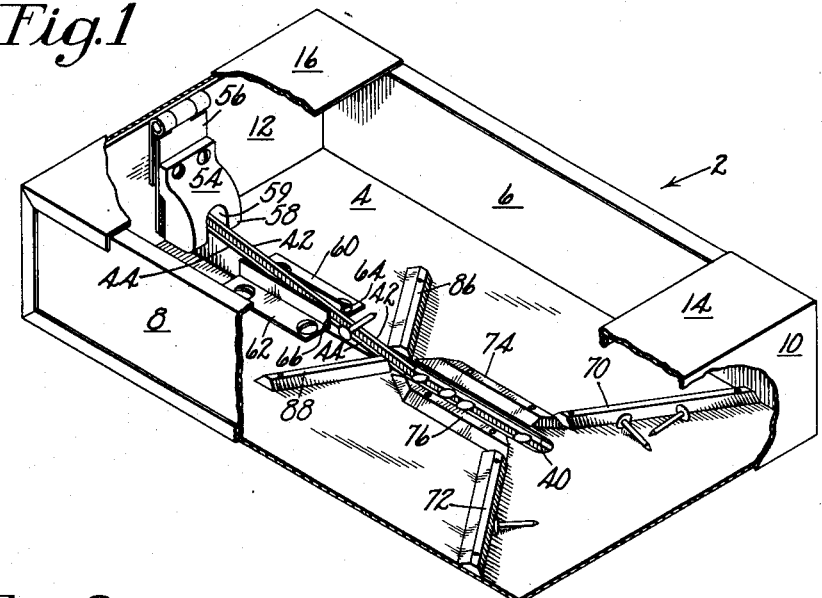
Fig.2
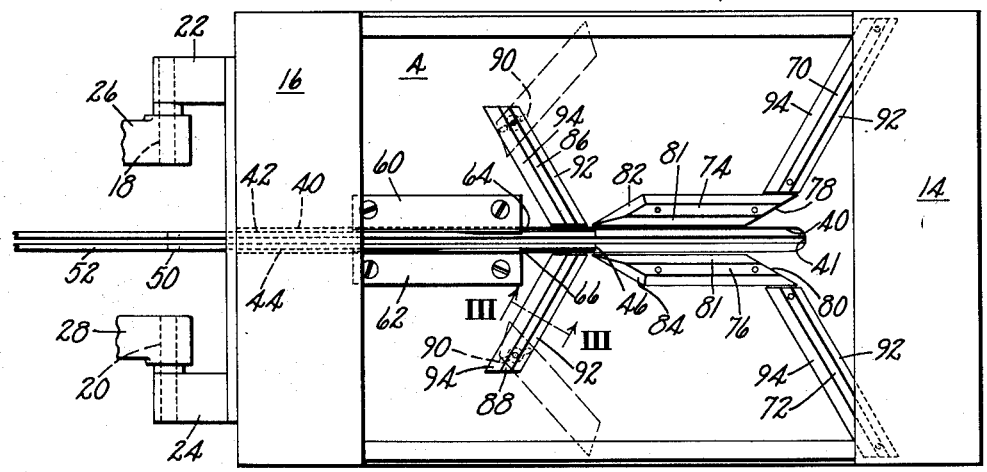
Fig.3
Inventor
John E. Belski
By his Attorney
Richard A. Wise

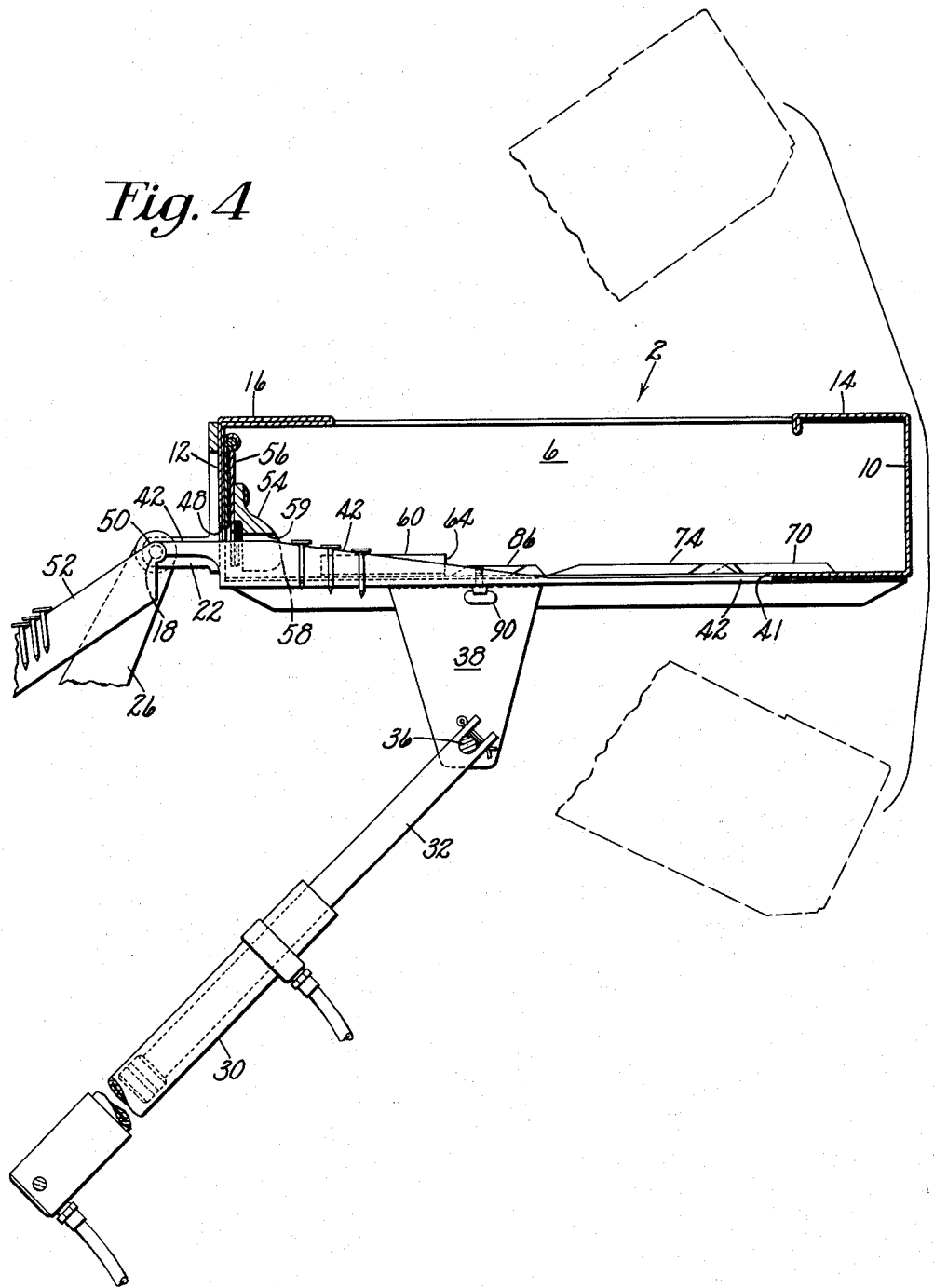

United States Patent Office 3,106,316
Patented Oct. 8, 1963

3,106,316
ARTICLE ORIENTING MECHANISMS
John E. Belski, Beverly, Mass., assignor to United Shoe Machinery Corporation, Boston, Mass., a corporation of New Jersey
Filed Oct. 18, 1960, Ser. No. 63,426
4 Claims. (Cl. 221—167)

This invention relates to article handling and more particularly to hoppers for orienting and feeding headed articles, such as fasteners and the like. One of a number of types of hopper mechanisms employed for orienting and feeding articles is known as a "tilt pot" hopper an example of which will be found in United States Patent No. 2,879,509, issued March 31, 1959 in the names of G. L. Congdon et al. It comprises a receptacle or box-like structure which is tilted up and down about a fixed axis located at one end whereby articles contained in it slide back and forth in random fashion. The structure includes a slotted raceway into which the shank portions of the headed articles fall and then slide suspended by their heads toward the fixed end of the hopper passing out through an appropriate opening.

One of the problems encountered with this type of hopper is that the articles tend to assemble in a mass when they slide back and forth. This blocks the exit end of the raceway. Failing adequately to disassociate themselves also means that very few articles are free to enter the raceway which often results in not enough articles entering the slotted raceway to satisfy with sufficient speed the tool or thing receiving the oriented articles. Another problem is that when the non-oriented articles slide in a mass they tend to obstruct those articles which have already become oriented within the raceway. It is to the solution of these problems that this invention is directed.

One object of this invention is to provide in a tilting hopper for orienting articles means for breaking up and dispersing masses of non-oriented articles which normally tend to accumulate within the hopper.

Another object is to provide in a tilting hopper for orienting articles means for preventing jams at its exit end.

Still another object is to provide in a tilting hopper having a raceway for orienting articles means for directing articles toward the raceway at its upper end to facilitate the entry of a maximum number of articles into the raceway.

Still another object is to provide in a hopper having a raceway means for preventing non-oriented articles from interfering with articles which have been oriented.

Applicant has found that jams which normally tend to occur at the exit end of the raceway can be prevented by the use of a swinging gate appropriately designed and constructed to prevent the articles from accumulating by arresting the movement of non-oriented nails before they reach the raceway exit. While this expediency has been used previously, swinging gates generally have been embodied in flat, plate-like structures pivoted at the exit end of the hopper but which have insufficient weight to dislodge accumulated nail masses and insufficient size and shape to stop the accumulation at the exit end. As a feature of this invention, applicant provides a swinging gate which has a large bulbous form with portions extending substantially away from the wall defining the exit end of the hopper. The swinging gate also has a high, proportionate weight relative to the weight of the articles in the hopper whereby it will remain in a substantial stationary position as the hopper is tilted downwardly, therefore urging the articles away from the exit wall when the hopper begins its downward tilting movement thereby augmenting the sliding movement of articles in mass and inducing a tumbling action to break up the mass.

As another feature of the invention, there is provided means in the form of one or more deflecting plates located in close proximity to the sides of the raceway which deflect from the raceway articles lying across the raceway or not properly aligned therein.

As another feature of this invention, there is provided a series of related baffle plates secured to the bottom of the hopper having means for deflecting articles into the upper end of the raceway, the same baffle members being specifically constructed and arranged to cause the sliding mass of articles to tumble and become disassociated from the mass as they move toward the exit end.

The above and other features of the invention including various novel details of construction and combinations of parts will now be more particularly described with reference to the accompanying drawings and pointed out in the claims. It will be understood that the particular machine embodying the invention is shown by way of illustration only and not as a limitation of the invention. The principles and features of this invention may be employed in varied and numerous embodiments without departing from the scope of the invention.

In the drawings:

FIG. 1 is a perspective view, partially broken away, of a hopper structure embodying the invention;

FIG. 2 is a plan view of the hopper structure shown in FIG. 1;

FIG. 3 is a sectional view taken on the line III—III of FIG. 2; and,

FIG. 4 is a side elevation, partially in section, of the hopper structure shown in FIG. 1 with means for tilting the hopper.

Referring to the drawings, there will be seen a hopper 2 in the form of an open top, rectangular box including a bottom 4, and sides or walls 6, 8, 10 and 12 with cover plates 14 and 16 partially covering the open top adjacent the sides 10 and 12, respectively. It will be understood that this hopper while herein shown as a rectangular box may be of any convenient configuration. The end of the hopper defined by the side 10 will hereinafter be known as the upper end and the end defined by the side 12 will be also known as the lower or exit end of the hopper. It follows that the side 12 is also known as the exit wall.

The hopper is tilted up and down between the broken line positions in FIG. 4 about a substantially horizontal fixed axis adjacent the exit end on fulcrum pins 18, 20 which extend between ears 22, 24 secured to the hopper and mounting brackets 26, 28 secured to any fixed structure. The hopper is tilted by an air motor 30 similar to that shown in the above-identified Congdon et al. patent and shown only schematically in FIG. 4. It may be replaced by any equivalent means, such as an electric motor with a crank drive. The air motor 30 includes a bifurcated operating arm 32 engaging a fulcrum pin 36 secured to a bracket 38 depending from the bottom of the hopper. The operating mechanism for the hopper forms no portion of this invention.

A slot 40 is formed in the bottom of the hopper and extends from a closed end 41 spaced from the upper end 10 to the exit wall 12. A pair of raceway plates 42, 44 are adjustably mounted within the slot 40 by means not shown but similar to those shown in the Congdon et al. patent and not forming a part of this invention. The upper or right-hand ends of the raceway plates are level and almost flush with the hopper bottom 4. This flat area constitutes the article entering portion of the raceway and terminates at a point 46. The plates 42, 44 thereafter slope gradually upwardly away from the bottom 4 and extend out through an opening 48 in the exit wall 12 of the hopper. The plates terminate at an arcuate junction 50 with a stationary raceway 52 shown at the left side of FIGS. 2 and 4.

A swinging gate member 54 is pivoted on a hinge 56 which, in the illustrative form of the invention, is secured to the wall 12 although it could also be secured to the cover plate 16. The gate member 54 is bulbous in shape having a lower portion 58 extending a substantial distance away from the wall 12 toward the upper end of the hopper. It is also bifurcated having an arch-like opening 59 bridging the raceway plates. The arch portion 59 is only slightly higher and wider than the height and width of the raceway plates to permit only the passage of articles suspended by their heads between the raceway plates. Therefore, any article moving down the raceway which may be lying transversely of the plates or otherwise not properly oriented engages the gate before it reaches and blocks the opening 48. This prevents the accumulation of a mass of articles at the exit. The gate member 54 is made heavy and of rugged construction. It is of sufficient weight relative to articles therein so that when the hopper is pivoted to the lower broken line position, as seen in FIG. 4, the gate member will remain substantially vertical. Thus, the wall member 12 pivots in a clockwise direction relative to the gate member. This relative movement causes any mass of accumulated articles lying in the hopper piled up against and around the exit end to be forcibly moved away and broken up since the relative movement between the hopper bottom and the gate 54 is the equivalent of the gate pivoting upwardly counterclockwise. This picks the articles up and out relatively to the hopper and supplements the gravitational forces normally causing the mass to slide only. This heavy bulbous construction of the swinging gate differs from the relatively light plate-like members heretofore used on this type of hopper, which members serve only the function of preventing improperly oriented articles from entering the opening 48 and not of disassociating masses of articles.

At least one, and preferably two, abutments in the form of angular plates 60, 62 are secured to the bottom of the hopper and have upstanding sides 64, 66 closely adjacent the raceway plates 42, 44. If an improperly oriented article is moving down the raceway and lying, for example, transversely of the plates, as seen in FIG. 1, it will be engaged by the sides 64, 66 of the abutment plates and deflected back into the hopper long before it reaches the swinging gate 54. The deflectors also serve to displace any mass of articles reaching it which have not otherwise been deflected away from the raceway by means now to be described.

A series of related baffles are secured to the bottom of the hopper and arranged so that articles will be directed into the upper or article entering portion of the raceway and away from the raceway beginning at the point 46 where it begins to ascend from the hopper bottom. The baffles include a first pair of members 70, 72 secured to the bottom of the hopper and inclined in a V configuration converging toward the end 41 of the slot 40 and pointing toward the exit end of the hopper. Lying parallel with the slot 40 is a second pair of baffles 74, 76 which have respectively, vertical guide surfaces 78, 80 forming a V configuration pointing downwardly of the hopper and toward the raceway. Each baffle also has a surface 81 sloping toward the raceway to induce articles to enter the raceway along this level portion. The baffles 74, 76 terminate in inclined walls 82, 84 sloping generally away from the raceway but pointed toward the point 46 where the raceway plates become elevated from the hopper bottom.

The baffle structure also includes a third set of baffles 86, 88 each of which is pivotally secured by a screw 90 to the hopper bottom whereby the baffles may be adjusted from the solid line positions shown in FIG. 2 to the broken line positions or any positions in between. In the solid line positions, the baffles 86, 88 diverge away from the raceway and toward the exit end of the hopper. When adjusted to positions parallel to the raceway, these baffles may be rendered substantially ineffective. They may also be arranged as shown in the broken line positions to impart an opposite effect on the articles as they are returned to the right-hand end of the hopper when the hopper is pivoted downwardly as will be explained in more detail hereinafter.

Each of the baffles of the different sets has a cross sectional shape, as shown in FIG. 3, and includes a steep sloping surface 92 and a gentle sloping surface 94, the surface 81 of the baffles 74, 76 having the same slope as the surfaces 94. The slope of the surfaces 92 are calculated to induce tumbling of the articles and that of the surfaces 94 to induce sliding. When the baffles are arranged as shown in FIG. 2, and the hopper is in its lowered position, the articles will be massed at the right-hand end of the hopper. As the hopper is elevated, the articles begin to slide toward the exit end and engage the surfaces 92 of the baffles 70, 72. A number of those in alignment with the slot 40 will enter the raceway without engaging the baffles. Those spaced nearer the sides 6 and 8 of the hopper will be induced to tumble over the baffles or slide inwardly toward the slot 40 until they either enter the raceway, or engage the vertical guide surfaces 78, 80 of the baffles 74, 76, whereupon they will be additionally guided toward the raceway. Some of those articles not quite entering the raceway adjacent the surfaces 78, 80 will slide toward the exit end and be induced toward the raceway by the surfaces 81 of the baffles 74, 76 which surfaces are inclined downwardly toward the slot 40.

Only a relatively few of the articles enter the raceway slot during any one oscillation of the hopper, most of the articles tending to move toward the exit end without entering the slot, unless the hopper is nearly empty. The articles which have entered the raceway slot will slide suspended by their heads downwardly of the raceway onto the elevated portion to the left of the point 46. It is desirable that no further articles enter the raceway beyond this point. Consequently, the baffles 86, 88 are usually positioned in the solid line positions. The moving mass of articles engages the tumbling surfaces 92 of the baffles 86, 88 and are tumbled outwardly and over the baffles away from the raceway. Those failing to be moved from the raceway will be engaged either by the sides 64, 66 of the abutment plates 60, 62 or the lower portion 58 of the swinging gate 54.

On the downward stroke of the hopper, the articles will be kicked back by the gate 54 and then engage the sliding surfaces 94 of the baffles 86, 88. They tend to move over the baffles without tumbling and be guided to some extent toward the raceway. It will be noted that the baffles 86, 88 terminate at the junction portion 46 of the raceway plates. Adjacent this point are also located the surfaces 82, 84 of the baffles 74, 76 which have slopes the same as the slopes 94 of the other baffles. These tend to direct the articles away rather than imparting a tumbling effect to them, the change of direction tending to separate articles from the sliding mass. Upon approaching the right-hand end of the hopper, articles engage the sloping surfaces 94 of the baffles 70, 72 and again move over these baffles in a sliding rather than a tumbling motion. Since the surfaces 82, 84 on the baffles 74, 76 are inclined away from the raceway as well as both surfaces 94 on the baffles 70, 72 they induce articles away from the upper end of the slot 41 so as not to disturb articles which have become oriented in the slot which did not reach the exit end of the raceway in the preceding stroke.

It will be appreciated that the cross sectional shape of the baffles including the slopes of the surfaces will be increased or decreased or their positions can be reversed by turning them around depending upon the particular articles contained in the hopper but they will retain the same relative shapes and slopes to provide both the tumbling and sliding effects to the articles all without departing from the scope of this invention.

Under certain conditions, it is desirable to employ the baffles 86, 88 to impart a tumbling motion to the articles as they are returned to the right-hand end of the hopper. In this instance they will be adjusted to their broken line positions, as shown in FIG. 2, which will cause the articles to tumble outwardly toward the sides 6 and 8 of the hopper. They may also be rendered substantially ineffective by orienting them parallel to the slot 40.

Having thus described my invention, what I claim as new and desire to secure by Letters Patent of the United States is:

1. In a hopper for orienting and delivering headed articles of the type which includes a raceway located substantially in the center of the hopper bottom and extending out through an exit wall, and means for tilting the hopper to cause articles to move back and forth and into the raceway suspended by their heads, the combination with the hopper of baffle means to induce tumbling of non-oriented articles as they move toward the exit end, said baffle means comprising ridge-like plate members in the hopper bottom and extending laterally outwardly from the raceway, on both sides, said plate members having steep sloping article engaging surfaces inclined upwardly toward the exit end of the hopper and gradual sloping article engaging surfaces inclined upwardly away from the exit end.

2. In a hopper for orienting and delivering headed articles of the type which includes a raceway in the hopper bottom having a level article entering portion and an elevated portion which slopes gradually upwardly from the hopper bottom and out through an exit wall, and means for tilting the hopper to cause articles to move back and forth and into the raceway suspended by their heads, the combination with the hopper of baffle means comprising plates secured to the hopper bottom in an open V configuration converging on the article entering portion of the raceway and pointed toward said exit wall, said baffle plates having steep sloping surfaces engageable with articles moving toward the exit end of the hopper to induce tumbling and gradual sloping surfaces engageable with articles moving in the opposite direction.

3. In a hopper for orienting and delivering headed articles of the type which includes a raceway in the hopper bottom having a level article entering portion and an elevated portion which slopes gradually upwardly from the hopper bottom and out through an exit wall, and means for tilting the hopper to cause articles to move back and forth and into the raceway suspended by their heads, the combination with the hopper of baffle means comprising plates secured to the hopper bottom adjacent to and parallel with the level article entering portion of the raceway, said baffle plates having first article engaging surfaces sloping downwardly toward the raceway to induce articles to move thereinto, and second article engaging guide surfaces on the end of the baffle plates located adjacent the junction between the level and the elevated portions of the raceway and diverging away from said exit end to direct articles away from the level portion of the raceway when the articles are moving away from the exit end.

4. In a hopper for orienting and delivering headed articles of the type which includes a raceway located substantially in the center of the hopper bottom and extending out through an exit wall, and means for tilting the hopper to cause articles to move back and forth and into the raceway suspended by their heads, the combination with the hopper of baffle means comprising plates secured to the hopper bottom and extending laterally outwardly from the raceway on both sides, said plates having steep sloping article engaging surfaces to induce tumbling when articles pass over them in one direction and gradual sloping article engaging surfaces to induce sliding as the articles pass over them in the opposite direction, and means mounting the baffle plates for pivotal adjustment about axes passing through the hopper bottom to present alternatively the steep sloping surfaces to articles moving in either direction.

References Cited in the file of this patent

UNITED STATES PATENTS

| | | |
|---|---|---|
| 276,639 | Smith | May 1, 1883 |
| 342,268 | Smith et al. | May 18, 1886 |
| 557,798 | Goo et al. | Apr. 7, 1896 |
| 1,225,837 | Mackenzie | May 15, 1917 |
| 1,482,427 | Boutin | Feb. 5, 1924 |
| 2,161,973 | Paxton | June 13, 1939 |
| 2,540,934 | Cook et al. | Feb. 6, 1951 |
| 2,639,445 | Fray | May 26, 1953 |
| 2,735,096 | Miller | Feb. 21, 1956 |
| 2,943,764 | Haberstump | July 5, 1960 |